US009165077B2

(12) United States Patent
Brodsky et al.

(10) Patent No.: US 9,165,077 B2
(45) Date of Patent: *Oct. 20, 2015

(54) TECHNOLOGY FOR WEB SITE CRAWLING

(71) Applicant: International Business Machines Corporation, Armonk, NY (US)

(72) Inventors: Elizabeth A. Brodsky, Olney, MD (US); Elmootazbellah N. Elnozahy, Austin, TX (US); Ramakrishnan Rajamony, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/169,115

(22) Filed: Jan. 30, 2014

(65) Prior Publication Data

US 2014/0149382 A1    May 29, 2014

Related U.S. Application Data

(63) Continuation of application No. 13/600,201, filed on Aug. 30, 2012, now abandoned, which is a continuation of application No. 09/736,349, filed on Dec. 14, 2000, now Pat. No. 8,452,850.

(51) Int. Cl.
G06F 17/30    (2006.01)

(52) U.S. Cl.
CPC .... G06F 17/30864 (2013.01); G06F 17/30902 (2013.01)

(58) Field of Classification Search
None
See application file for complete search history.

(56) References Cited

U.S. PATENT DOCUMENTS

| 6,026,413 | A  | 2/2000 | Challenger |
| 6,038,601 | A  | 3/2000 | Lambert |
| 6,038,610 | A  | 3/2000 | Belfiore |
| 6,182,085 | B1 | 1/2001 | Eichstaedt |
| 6,189,019 | B1 | 2/2001 | Blumer |
| 6,219,676 | B1 | 4/2001 | Reiner |
| 6,256,623 | B1 | 7/2001 | Jones |
| 6,263,364 | B1 | 7/2001 | Najork |

(Continued)

OTHER PUBLICATIONS

Brandman et al., "Crawler-Friendloy Web Servers," Sep. 2000.
(Continued)

*Primary Examiner* — Abdullahi E Salad
(74) *Attorney, Agent, or Firm* — Anthony V. S. England; William J. Stock

(57) ABSTRACT

A web site page has a reference for providing an address for a next page. The web site is crawled by a crawler program, which parses the reference from one of the web pages and sends the reference to an applet running in a browser. The address for the next page is determined by the browser responsive to the reference and is sent to the crawler. The crawler selects non-hypertext-link parameters from the web page of the web site server by performing a programmed action sequence, including selecting items from lists of the web page in a particular sequence. The crawler sends the applet running in the browser, for the query to the web server for the next page referenced by the one web page, the selected parameters and a context arising from the particular sequence.

15 Claims, 5 Drawing Sheets

(56) References Cited

U.S. PATENT DOCUMENTS

| | | |
|---|---|---|
| 6,301,614 B1 | 10/2001 | Najork |
| 6,389,462 B1 | 5/2002 | Cohen et al. |
| 6,411,999 B1 | 6/2002 | Tinkler |
| 6,418,452 B1 | 7/2002 | Kraft |
| 6,449,636 B1 | 9/2002 | Kredo |
| 6,484,149 B1 | 11/2002 | Jammes |
| 6,665,658 B1 | 12/2003 | DaCosta |
| 6,735,169 B1 | 5/2004 | Albert |
| 6,748,418 B1 | 6/2004 | Yoshida |
| 8,452,850 B2 | 5/2013 | Brodsky |
| 2002/0087559 A1 | 7/2002 | Pratt |
| 2006/0136377 A1* | 6/2006 | Patt-Shamir et al. ............. 707/3 |
| 2006/0253582 A1* | 11/2006 | Dixon et al. ................. 709/225 |
| 2009/0204610 A1* | 8/2009 | Hellstrom et al. ................ 707/5 |
| 2009/0248622 A1* | 10/2009 | Zhang et al. ...................... 707/2 |

OTHER PUBLICATIONS

Jul. 19, 2004_09736349_NFR.
Feb. 24, 2005_09736349_FR.
Jun. 22, 2005_09736349_FR.
Jan. 4, 2006_09736349_FR.
Sep. 7, 2006_09736349_NFR.
Mar. 21, 2008_09736349_ExamAnswer.
Oct. 2, 2009_09736349_ExamAnswer.
Jul. 17, 2012_09736349_AppealDecision.
Oct. 2, 2012_09736349_NFR.
Dec. 3, 2012_09736349_NFR.
Jan. 24, 2013_09736349_NOA.
Aug. 1, 2013_13600201_NFR.
Feb. 12, 2014_13600201_NoticeOfAllowance.
Jun. 4, 2014_13600201_NoticeOfAbandonment.

* cited by examiner

TECHNOLOGY FOR WEB SITE CRAWLING

CROSS-REFERENCE TO RELATED APPLICATION

This application is a continuation of prior application Ser. No. 13/600,201 filed Aug. 30, 2012, which is a continuation of application Ser. No. 09/736,349, now issued U.S. Pat. No. 8,452,850 filed Dec. 14, 2000, and claims the benefit of the earliest priority date thereof.

BACKGROUND OF THE INVENTION

1. Field of the Invention

In one embodiment, this invention concerns crawling a web site on the World Wide Web ("WWW"), and more specifically a web site wherein at least one web page in the web site has a reference for executing by a browser to produce an address for a next page. In this context, the invention also concerns web pages that are dynamically generated responsive to queries, such as queries associated with the crawling. This includes preemptively transforming dynamically generated web pages into static web pages.

2. Description of the Related Art

The World Wide Web is an interconnected network of computers and information appliances. Clients use the WWW to send requests to servers, which send back responses. "Static data" is server response data that already exists on the server at the time of the request and that is merely served back to the client without change by the server. A news article is an example of static data. While the news may change daily, or even minute-by-minute, nevertheless, according to the typical scenario, an article is created in response to a news item, and then the article is put on the server as a static document. That is, the article itself does not subsequently change, even though other, newer articles will sooner or later be placed on the server too. This is in contrast to "dynamic data" that is created by the server in direct response to a client request. A web page displaying a bank account balance or stock positions in a trading account is an example of a page that is created by the server and that may change with each interaction between the client and the server.

Dynamically generating data tends to impose a substantial load on server resources. While this load could be mitigated by precomputing responses in anticipation of all possible requests, such a course of action will require substantial resources for both computing the responses and for storing them. Some middle ground may be ideal, where the server stores most likely requested information in static form, and creates other information on demand.

A web site may thus choose to convert a subset of its content to be delivered statically in order to reduce server resource demands. The conversion may be done manually, by employing web page designers. However, such a scheme is inflexible since any changes to the data or its presentation will require a large number of web pages to be manually recreated. An alternative is to automatically generate the static responses using the raw data on the web site. A program could be set up to format the extracted data (such as from database queries) and encapsulate it within the appropriate HTML content, thus creating static pages. The disadvantage of this approach is that the program must be provided with the parameters with which to query the database as well as the inter-document hierarchy which specifies how the documents will be hyperlinked together. Determining and providing this information requires significant resources. There is thus a need for an automated method that can be used to easily convert subsets of a web site to static content.

Use of a crawler would be advantageous for automating this conversion of a web site to static content, however there are numerous difficulties that prevent this. Conventional search engine crawlers start with a URL and repeatedly de-reference all unexplored URLs in the received responses. One reason conventional crawlers are not suitable for the "staticizing" problem concerns actions sequences that must be performed to obtain a particular end data set for a conventional HTML query. Furthermore, references from one web page to another may not be straightforward. That is, a reference may not be simply set out on the page as a hyperlink address, but instead may be a script, form, selection menu, or button for example. Thus a need exists for improvements in crawler programs, to overcome their limitations so that they may be used for the staticizing problem as well as other applications.

SUMMARY OF THE INVENTION

The foregoing need is addressed in the present invention. According to the invention, a web server that dynamically generates responses is queried and the resulting responses are saved so that the saved static data can be used on the server to avoid subsequent dynamic content generation. An advantage of this approach is that the existing dynamic content generating mechanisms present in the web site are harnessed to do much of the work of producing the static web pages.

In one embodiment, a crawler program "crawls the web site," that is, generates queries to the server, responsive to references from one web page to another in the content provided by web site. The queries cause the server to generate dynamic data and return web pages that include those results. These web pages are then processed and saved, so that the web pages can be served in response to future queries. This eliminates the need to generate dynamic data on demand for these particular queries.

The web pages dynamically generated in response to particular requests, may have included in them operations that would call for the server to generate more dynamic data if the received data were used to generate additional requests to the server. That is, if one of the pages as received was used to generate additional requests to the server, such as by a user filling in fields on a form in the page, clicking on a button, selecting an item in a selection menu, etc., this would cause the server to generate more data dynamically. In another aspect, the received web pages are converted by removing at least some of these operations and replacing them with references to corresponding ones of the returned web pages.

It is advantageous that since the web pages are produced by interaction of the crawler and the web site, if the web site changes, then static web pages can be updated merely by having the crawler program crawl the web site again.

The term "crawler" conventionally refers to a search engine, going through the WWW to obtain data to build indices. As stated above, one reason conventional crawlers are not suitable for the present invention concerns actions sequences that must be performed to obtain a particular end data set for a conventional HTML query. Accordingly, in one aspect of an embodiment of the crawler of the present invention, the crawler is programmable to perform particular actions sequences for generating queries to the web server.

Furthermore, references from one web page to another may not be straightforward. That is, as stated above, a reference may not be simply set out on the page as a hyperlink address, but instead may be specified by a script, for example, so that the address is produced only when a client browser executes the reference. A reference that is generated in this manner is very dependent on the context in which it is produced, that is, the history that led up to it, including the state of the server and the client browser. To generate references of this sort in connection with generating the requests to the server, another aspect of the invention arises. According to an embodiment, the crawler parses each received web page and sends references to an applet developed for an embodiment of the present invention that runs in the browser. (This applet may be referred to herein as a "JavaScript execution engine" or simply "JEE.") The browser determines the address for a next page responsive to such a reference, so that the browser may receive the next page and any cookie for the next page from the server, and the JEE returns the address and any cookie to the crawler program.

Due to this JavaScript execution engine, a further difficulty arises for which there is no obvious solution. For security reasons, according to browser conventions, an applet running on a client browser can only interact with objects in a web page if the web page and the applet are loaded onto the client from the same server. Furthermore, the applet cannot conventionally communicate with the client except in a very limited manner. To overcome these limitations, another aspect arises. According to an embodiment, the client browser is configured to use a certain proxy gateway, and refer to a certain file (referred to herein as the "resolver file") containing cross-referencing for hostname-to-IP-address-resolution. The proxy gateway for the client's browser has a certain IP address. The resolver file is configured so that the resolver file indicates the IP address of the proxy gateway as the IP address for the web site server. In this manner, the JavaScript execution engine running on the client appears to the client's browser to be from the same server as the web pages, which permits the JEE to communicate with the crawler and the browser unhindered by conventional limitations. Since the proxy gateway is not really the source of the web pages, it may be referred to herein as a "spoof proxy."

Also due to the JEE another issue arises. In connection with parsing web pages, the JEE needs to know when a web page being received from the server has been fully loaded. There is a conventional HTML document attribute that is useful for this purpose, the "onload" attribute. However, in a normal case the web pages being processed by the JEE were not produced with the JEE in mind. That is, the onload attribute may not be included in the web pages, or may not be included in a fashion suited for use with the JEE. Therefore, in another aspect, the spoof proxy adds the onload attribute to each received web page which does not already have the attribute, and defines an event handler that sets a certain variable. Then, this variable is polled by the JEE to determine when the page is loaded.

In another embodiment, a computer program product provides a crawler for crawling a web site and reduces dynamic data generation on the web site server. The computer product includes instructions for querying a web site server by a crawler program responsive to references from one web page to another in the content provided by web site. The queries are for causing the server to generate data and return web pages that include the data. The product also includes instructions for processing and saving versions of web pages received from the server, so that the web pages can be served in response to future queries.

In a further aspect, the computer program product includes instructions for processing the received web pages, which includes removing at least some of these operations and replacing them with references corresponding to the returned web pages.

In another aspect, the computer program product includes instructions for causing the crawler to parse the received web pages and send references to an applet running in a client browser. The instructions also include instructions for causing the browser to determine the address for a next page responsive to the references, so that the browser may receive the next page and any cookie for the next page from the server. In this aspect, the instructions also include instructions for causing the applet to return the address and any cookie to the crawler program.

In another aspect, the computer program product includes instructions for causing the proxy to add an onload attribute to a received web page, and define an event handler that sets a certain variable, and instructions for causing the applet to poll the certain variable to determine when the page is loaded.

In another embodiment, an apparatus includes a processor connected to a network. A storage device is connected to the processor and the network for storing a program for controlling the processor. The processor is operative with the program to query a web site server, responsive to references from one web page to another in the content provided by web site. The processor is also operative with the program to process and save versions of web pages received from the server, so that the web pages can be served in response to future queries.

In another aspect, the processor is operative with the program to convert the received web pages, by removing at least some of these operations and replacing them with references to corresponding ones of the returned web pages.

In a further aspect, the processor is operative with the program to parse the received web pages and send references to an applet executing within a client browser. Also, the processor is further operative with the program to cause the applet to cause the browser to determine the address for a next page responsive to such a reference, so that the browser may receive the next page and any cookie for the next page from the server. Also, the processor is further operative with the program to cause the crawler to receive the address and any cookie from the JEE.

In a still further aspect, the processor is operative with the program to cause the proxy to add an onload attribute to a received web page, and define an event handler therefor that sets a certain variable, and cause the applet to poll the certain variable to determine when the page is loaded.

It should be appreciated from the foregoing that the invention advantageously reduces limitations in the usefulness of crawler programs. In one resulting application, the improved crawler eliminates the need to generate data dynamically for certain queries by creating static web pages for those queries. This reduces computational load on a web server. It is also advantageous that since the static web pages are produced by interaction of the crawler and the web site server, if the web site changes, then the static web pages can be updated merely by having the crawler program crawl the web site again. These and other advantages of the invention will be further apparent from the following drawings and detailed description.

BRIEF DESCRIPTION OF THE DRAWING

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

Figure 1:
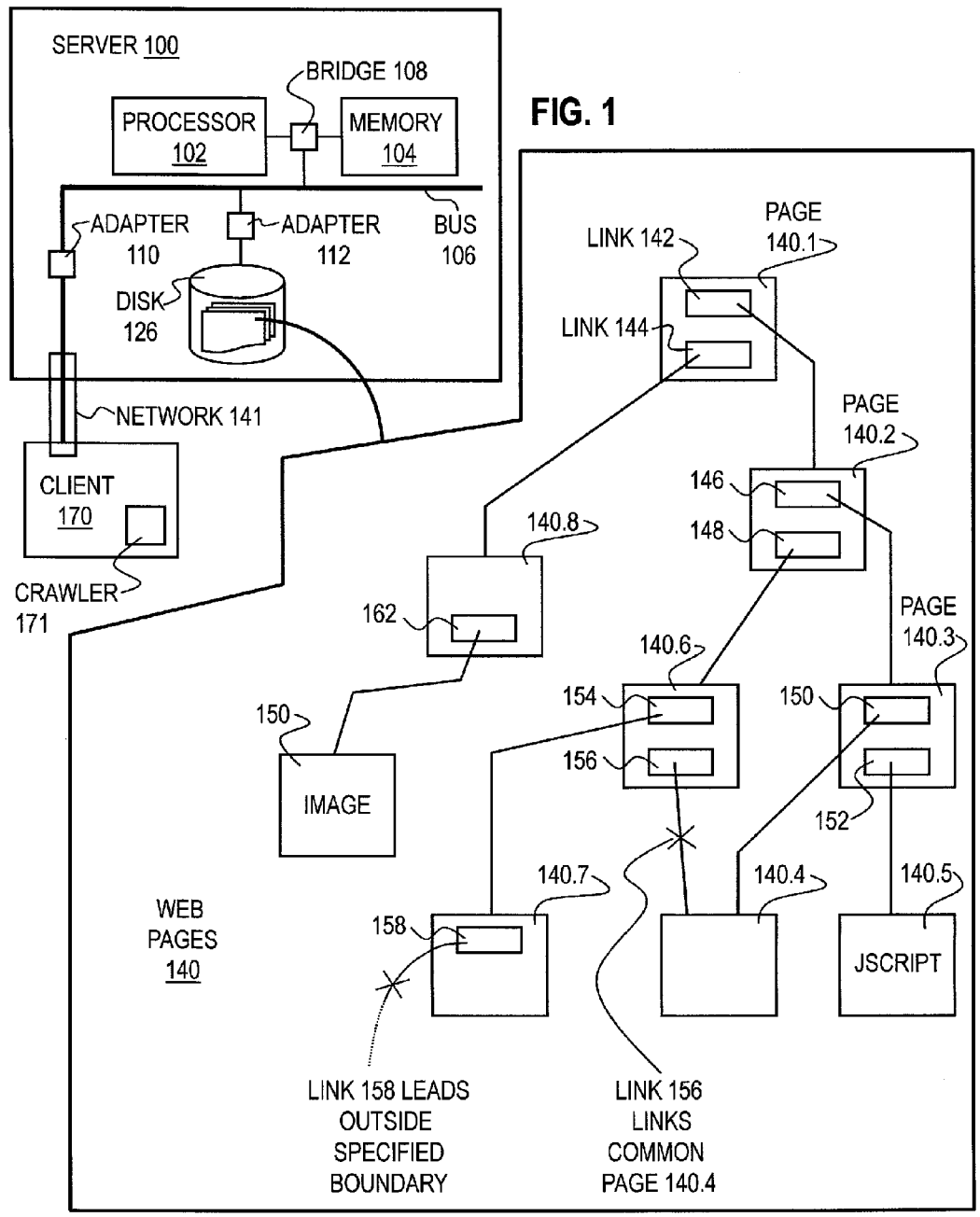
FIG. 1 illustrates crawling references among web pages, in accordance with an embodiment of the present invention.

Referring now to FIG. 1, a server 100 is shown for hosting a web site. The server has a processor 102 coupled to a bus 106 through a bridge 108. Also coupled to the bus through the bridge is memory 104. Disk 126 is coupled to the bus through an adapter 112 for storing web pages to be served up to users, such as client 170, over the network 141 which is coupled to the bus through adapter 110. Server 100 uses its resources (processor 102, bus 106, bridge 108, memory 104, adaptor 110, and disk 126) to dynamically generate responses to queries received over the network adaptor 110.

Client 170 has a crawler program 171 for generating queries to the server 100 responsive to references from one web page to another in the content delivered by web server 100. Specifically, first page 140.1 is shown having a first reference 142 linking page 140.1 to page 140.2. The crawler program 171 in client 170, responsive to reference 142, queries server 100 for the second web page 140.2. Then, upon receiving web page 140.2 the client 170 queries server 100 for web page 140.3, responsive to reference 146. (It should be understood that the queries could proceed in a different sequence, instead of the depth-first search illustrated in FIG. 1. For example, each reference in the top page 140.1 could be crawled to a next page before crawling any references in any of the next pages.)

After having received page 140.3, the client 170 queries server 100 for web page 140.4 responsive to reference 150, and queries for web page 140.5 responsive to reference 152. Since page 140.5 is a JavaScript source page, the crawler program does not produce any queries responsive to page 140.5. Page 140.4 does not have any references to other web pages, so the crawling has reached a dead end with web pages 140.5 and 140.4.

Returning back up the hierarchy of pages to page 140.2, the crawler queries for web page 140.6 responsive to reference 148 in page 140.2. In response to reference 154 in web page 140.6, the crawler queries for page 140.7. Page 140.7 has one reference 158, which leads to a web page outside a boundary that has been specified to crawler, so this reference is not crawled.

Returning back up the hierarchy of pages to page 140.1, responsive to reference 144 crawler 171 queries for page 140.8. Upon receiving page 140.8, crawler 171 queries for page 140.7, responsive to reference 160. Crawler 171 determines that reference 160 is a reference to page 140.7, which is in common with reference 154, so reference 160 is not crawled. Responsive to reference 162, crawler 171 queries so that client 170 receives page 150. Since page 150 is an image, this page is not crawled.

In the above discussion, it must be noted that the references between two pages could be more than just conventional hyperlinks. The references could be script references, selection menus, forms, buttons or other elements.

Figure 2:
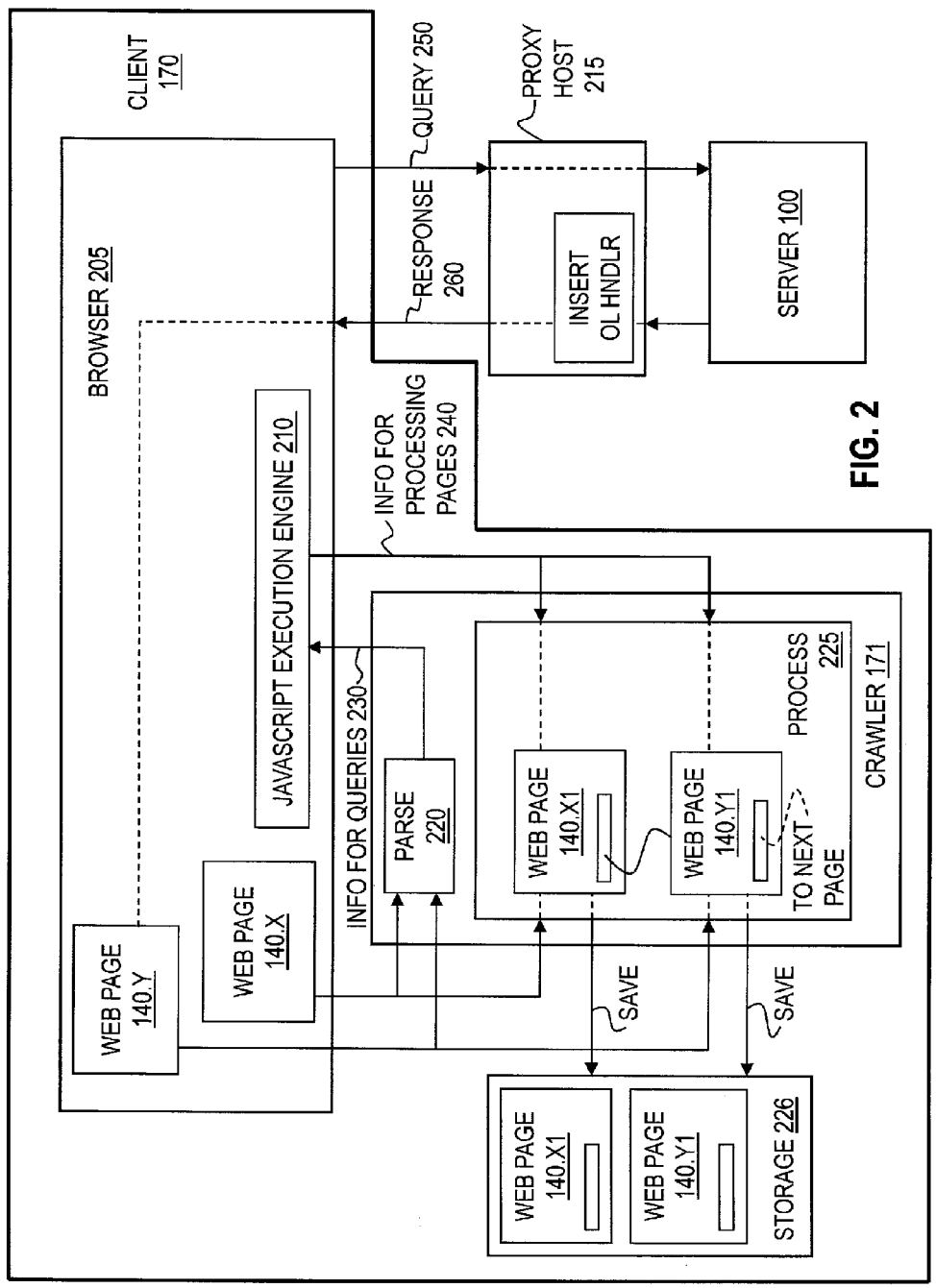
FIG. 2 illustrates receiving, processing and saving versions of the web pages, in accordance with an embodiment of the present invention.

Referring now to FIG. 2, client 170 is shown with programs running, including browser 205 and crawler 171. (It should be understood that programs run on a processor (not shown) of client 170, responsive to instructions stored on client 170 storage, such as storage 226.) A first web page 140.X is loaded in the browser 205. The crawler 171 includes a function 220 for parsing information from web pages loaded in the browser 205, such as 140.X, and passing the information 230 to the browser 205 for interpreting the information, which concerns references to other pages, such as that from 140.X to 140.Y, and generating queries for the other pages.

To understand the context of these operations, it should be understood that a reference may not be simply set out on a web page as an address, but instead may be specified by a script, selection menu, form, button or other element, so that the address needs to be produced by the client browser executing the reference. A reference that is generated in this manner is very dependent on the context in which it is produced, that is, the history that led up to it, including the state of the server and the client browser. So to generate references of this sort in connection with generating the requests to the server, the crawler 171 parses each received web page, such as page 140.X, and sends references parsed from the page to a JavaScript execution engine 210 that runs in the browser 205, for generating a query for web page 140.Y. That is, browser 205 determines from the information 230 that page 140.Y is referenced in referencing information in page 140.X.

It must also be understood that the crawler 171 may directly obtain the page 140.X from the web server 100 and parse it, consulting browser 205 only when encountering references other than simple hyperlinks, such as that linking page 140.X to page 140.Y.

Browser 205 generates an address for the page 140.Y and sends the address in a query 250 to a proxy host 215, which passes the query to server 100. Server 100 returns the web page 140.Y, and proxy host 215 adds an onload handler to the page sends the page 140.Y to browser 205.

It should be understood that web page 140.X includes the results of data dynamically generated in server 100 for an earlier query 250 that resulted in the page 140.X, but 140.X also has operations included in it linking it to page 140.Y, that call for the server 100 to generate more dynamic data to produce web page 140.Y. Therefore, web page 140.X needs to be converted by removing these operations and replacing them with references to a "version of" the returned web page 140.Y. The reference must be to 140.Y1, a "version of" web page 140.Y, because 140.Y may itself have operations included linking it to a next page also calling for the server 100 to generate more dynamic data to produce the next page.

To deal with these issues, the crawler also includes a processing function 225. The browser 205 passes information 240 back to the crawler 171 for the crawler to use for processing the web pages and saving versions thereof. In the illustration, web pages 140.X and 140.Y are processed to generate new versions 140.X1 and 140.Y1, which are saved in storage 226. The browser uses the onload handler to determine when the page 140.Y is fully loaded, and signals the crawler when this occurs. Browser 205 also sends the address for page 140.Y to the crawler 171 for use in processing. Also, the browser 205 sends to the crawler 171 any cookie that the server 100 sent in association with the query 250, so the crawler can use the cookie when requesting web page 140.Y.

In one aspect of an embodiment of the crawler of the present invention, the crawler is programmable to perform particular actions sequences for generating queries to the web server. To clarify, consider an example of actions performed by a user to obtain a particular end data set using a conventional web page form.

Figure 3:
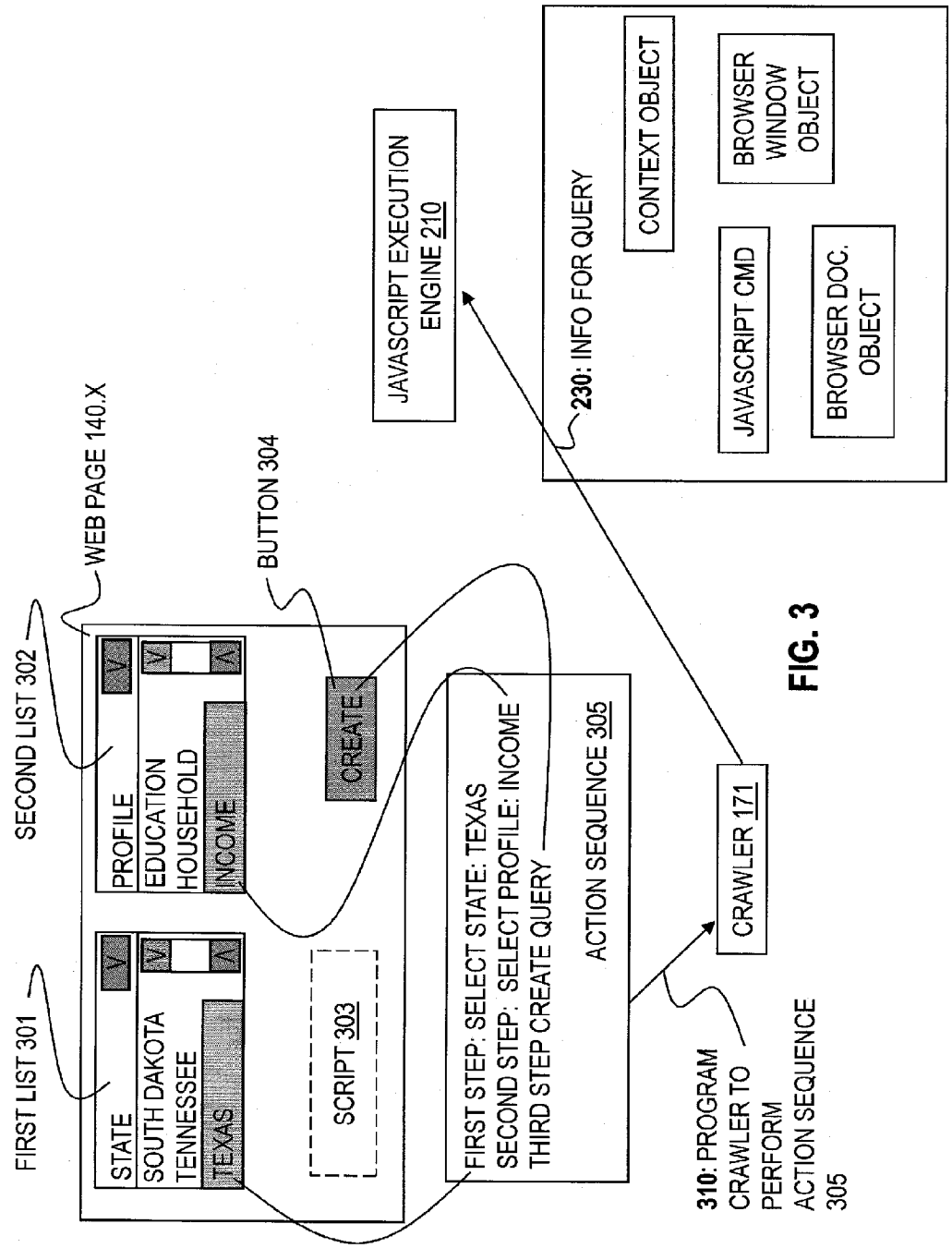
FIG. 3 illustrates performing an action sequence, in accordance with an embodiment of the present invention.

Referring now to FIG. 3, Web page 140.X is shown in further detail. The page 140.X has two lists 301 and 302, for selecting parameters for generating a query. First list 301 is for selecting a state. Second list 302 is for a profile. In the example, in a conventional web page access, where a user is controlling browser 205, if the user wants to obtain income information for the state of Texas from a Community Facts page in the American Fact Finder web site (factfinder.census.gov), the user performs the following action sequence 305:
1. Select Texas as the State from list 301.
2. Select Income as the Profile from list 302.
3. Click on the create button 304, which causes a script 303 to query server 100 with a request that includes the parameters selected from the lists 301 and 302. The point to note is that obtaining the desired data requires these actions to be performed, in the proper sequence. Conventional crawlers have not been programmed to do this. Accordingly, in one aspect of an embodiment of the crawler 171 of the present invention, the crawler is programmed as shown at 310 to perform particular actions sequences for generating information 230 to pass to the JEE 210 for generating queries to the web server 100. In the example, the information 230 includes the JavaScript command that invokes script 303 when button 304 is clicked. Also including in the information 230 is a context object, the browser window object, and the document object associated with page 140.X in its context as it exists, loaded in browser 205.

Due to JavaScript execution engine 210, a further difficulty arises for which there is no obvious solution. For security reasons, according to HTML conventions, an applet running on a browser can only interact with objects in a web page if the web page and the applet are loaded onto the client from the same server. Furthermore, the applet cannot conventionally communicate with the client except in a very limited manner. To overcome these limitations, another inventive aspect arises.

Figure 4:
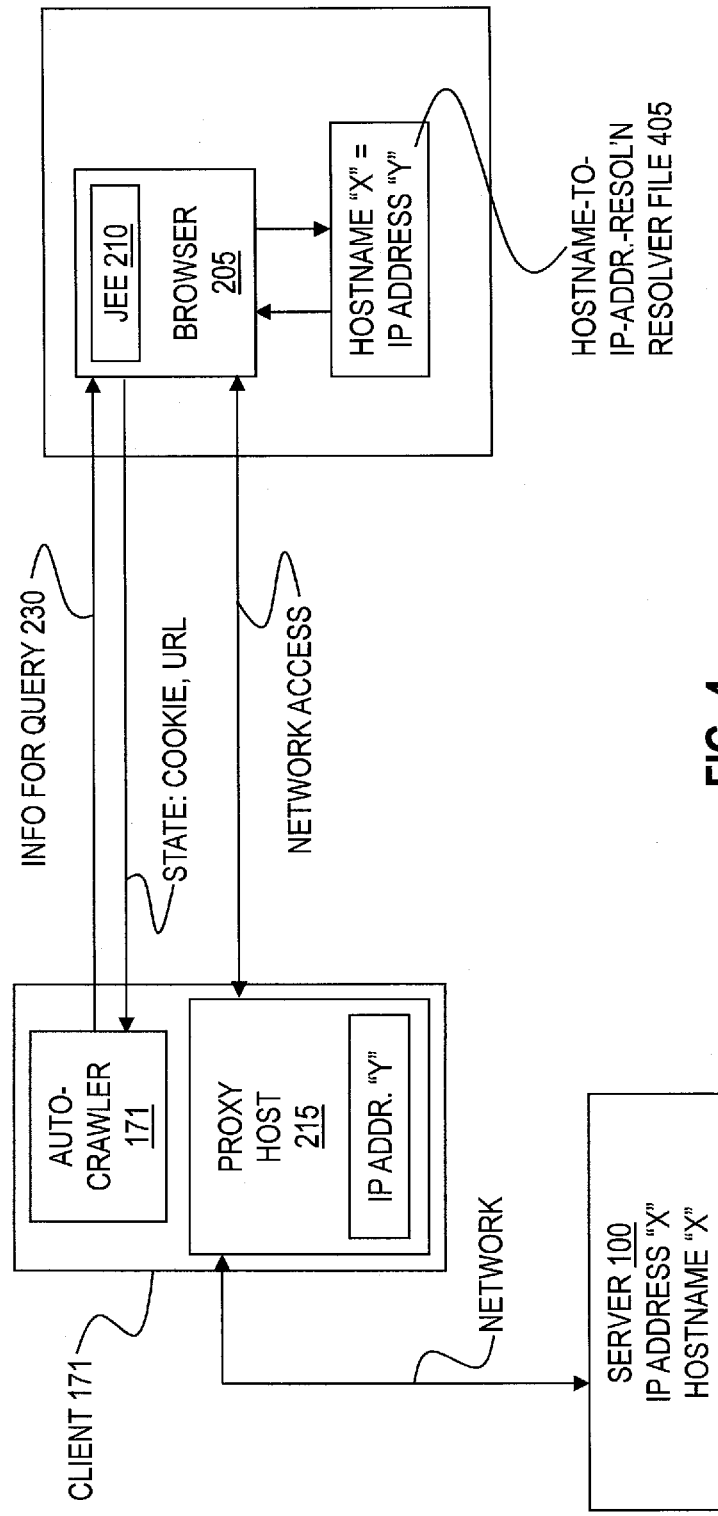
FIG. 4 illustrates certain interactions among a crawler, applet for JavaScript execution, browser, spoof proxy and web server, in accordance with an embodiment of the present invention.

Referring now to FIG. 4, according to an embodiment, the client browser is configured to use a certain proxy host 210, and refer to a certain hostname-to-IP-address-resolution resolver file 405 containing cross-referencing for hostname-to-IP-address-resolution. The proxy host 215 for the client's browser 205 has a certain IP address, shown for illustration as "IP Addr. Y." Likewise, the server 100 has a certain hostname, illustrated as "Hostname X," and a certain IP address, illustrated as "IP Address X." The resolver file 405 is configured so that it indicates the server 100 hostname, "Hostname X" equals proxy host 215 IP address, "IP Addr. Y." In this manner, the JavaScript execution engine running on the client appears to the client's browser to be from the same server as the web pages. This permits the JEE 210 to communicate with the browser 205 unhindered by certain conventional limitations. Since the proxy host 215 is not really the source of the web pages, it may be referred to as a "spoof proxy."

Also due to the JEE 210 another issue arises. In connection with parsing web pages, the crawler 171 needs to know when a web page being received from the server has been fully loaded by the browser 205. There is a conventional HTML document attribute that is useful for this purpose, the "onload" attribute. However, in a normal case the web pages being processed by the JEE were not produced with the JEE in mind. That is, the onload attribute may not be included in the web pages, or may not be included in a fashion suited for use with the JEE. Therefore, in another aspect as shown in FIG. 2, the proxy host 215 adds the onload attribute to each received web page which does not already have the attribute, and defines an event handler that sets a certain variable. Then, this variable is polled by the JEE to determine when the page is loaded, and the JEE 210 171 signals the crawler accordingly.

Figure 5:
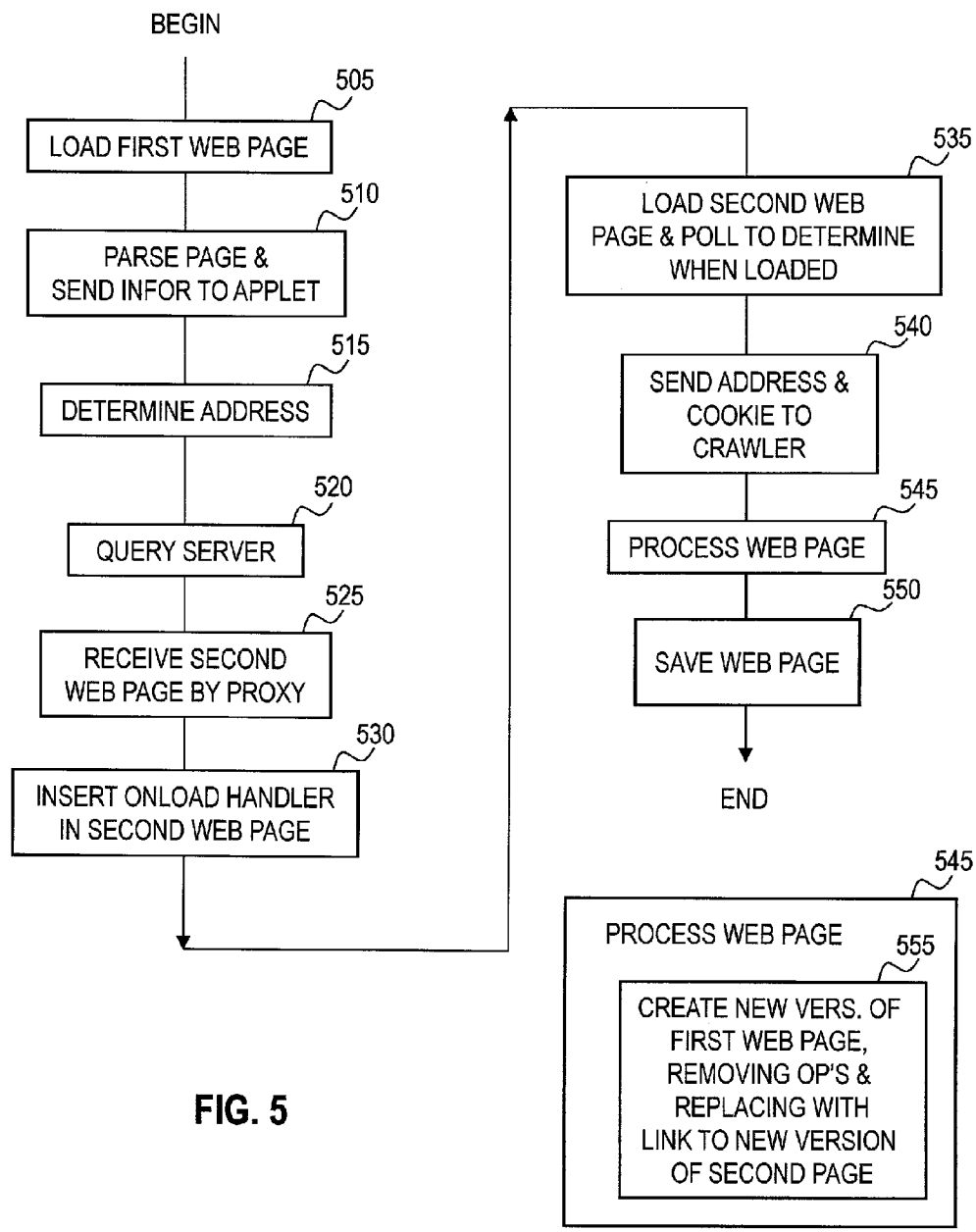
FIG. 5 illustrates a flow chart for method steps, in accordance with an embodiment of the present invention.

Referring now to FIG. 5, a flow chart is shown for method steps, in accordance with an embodiment of the present invention. (It should be understood that the steps are not necessarily performed strictly in the sequence shown. Some variation is sequence is contemplated according to the invention.) Beginning at step 505, a first web page is loaded. Next, at step 510 the page is parsed and information 230 is sent to the JEE 210. The JEE 210 and browser 205 determine an address from the information 230, in step 515, and the browser sends a query for the server 100, in step 520. Next, in step 525, a second web page is received by the proxy host 215. Then, in step 530, the proxy host inserts an onload handler in the second page. Then, in step 535, the page is loaded in the browser 205, and a variable set by the onload handler is polled to determine when the page is loaded. Also, in step 540, the address and cookie for the page are sent from the browser to the crawler 171. In step 545, the first web page is processed. A more detailed variation of step 545 is also shown, wherein a new version of the first web page is created, with a local file name, by replacing operations that would otherwise generate dynamic data, and linking the first page to a new version of the second page, the second page also being assigned a local file name.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present embodiment has been presented for purposes of illustration and description, but is not intended to be exhaustive or to limit the invention to the form disclosed. Many modifications and variations will be apparent to those of ordinary skill in the art. For example, the invention leverages scripting and event notification mechanisms in HTML 4.0 and JavaScript 1.1 to measure and collect response time experienced by a client. HTML 4.0 and JavaScript 1.1 are supported by both Netscape Navigator 3.x and above, and Internet Explorer 4.x and above, both of which are now fairly the de facto standard browsers. Microsoft's implementation of JavaScript is officially known as JScript, and can be considered to be the same as JavaScript for the purposes herein. The invention is not limited to these embodiments, and is equally applicable to embodiments with other scripting languages such as Visual Basic or Tcl, or to embodiments with Java or cookies. An advantage of implementing the invention with JavaScript, is that it is supported by most browsers.

While the embodiment described herein uses an applet executing within a browser as a script execution engine, it should be understood that other embodiments of the script execution engine are within the scope of the invention. For example, the Gecko browser engine from Netscape could be used for the execution engine.

While "staticising" a web site is an application described herein for the crawler of the present embodiment, it should be understood that other applications are within the scope of use of the crawler of the present invention. For example, the crawler may also be used to archive a web site.

Those of ordinary skill in the art will appreciate that the hardware in FIG. 1 may vary depending on the implementation. For example, other peripheral devices, such as optical disk drives and the like, may be used in addition to or in place of the hardware depicted in FIG. 1. The depicted example is not meant to imply architectural limitations with respect to the present invention. For example, the processes of the present invention may be applied to multiprocessor data processing systems.

The embodiment was chosen and described in order to best explain the principles of the invention, the practical application, and to enable others of ordinary skill in the art to understand the invention. Various other embodiments having various modifications may be suited to a particular use contemplated, but may be within the scope of the present invention.

The invention claimed is:

1. A method for crawling a web site, the method comprising:
   querying a web site server by a crawler program, wherein at least one page of the web site has a reference, wherein the reference is specified by a script to produce an address for a next page;
   parsing such a reference from one of the web pages by the crawler program and sending the reference to an applet running in a browser; and
   determining the address for the next page by the browser executing the reference and sending the address to the crawler, wherein the crawler automatically selects non-hypertext-link parameters from the one web page of the web site server by performing a programmed action sequence, including selecting items from lists of the one web page in a particular sequence, and the crawler sends the applet running in the browser, for the query to the web server for the next page referenced by the one web page, the selected parameters and a context arising from the particular sequence.

2. The method of claim 1, the browser being configured to use a certain proxy and refer to a resolver file for hostname-to-IP-address-resolution, wherein the web site server has an IP address and the proxy for the browser has a certain IP address, the certain IP address of the proxy being different than the IP address of the web site server, and wherein the resolver file indicates the certain IP address of the proxy as the IP address for the web site server.

3. The method of claim 1, wherein the browser is configured to use a proxy gateway and the method further comprises:
   adding an onload attribute to one of the web pages by the proxy;
   defining an event handler for the onload attribute by the proxy, wherein the event handler sets a certain variable; and
   polling the certain variable by the applet to determine when the page is loaded.

4. The method of claim 1, at least one of the web pages being dynamically generated by the server responsive to corresponding ones of the queries, comprising:
   processing the server generated web pages to generate corresponding processed versions of the web pages, so that the processed versions can be served in response to future queries, reducing dynamic generation of web pages by the server.

5. The method of claim 4, wherein at least a first such server generated web page has included in it an operation that would cause the server to dynamically generate a second web page if the first page were used to generate further requests to the server, and wherein processing the server generated web pages comprises:
   removing the operation from the first server generated web page and replacing the operation with a reference to a version of another of the server generated web pages.

6. A computer program product for crawling a web site, wherein the computer program product resides on a computer readable, recordable-type storage device having computer readable program code, the program code comprising:
   first instructions for querying a web site server by a crawler program, wherein at least one page of the web site has a reference, wherein the reference is specified by a script for producing an address for a next page;
   second instructions for parsing such a reference from one of the web pages by the crawler program and sending the reference to an applet running in a browser; and
   third instructions for determining the address for the next page by the browser executing the reference and sending the address to the crawler, wherein the first instructions comprise instructions for causing the crawler to automatically select non-hypertext-link parameters from the one web page of the web site server by performing a programmed action sequence, including selecting items from lists of the one web page in a particular sequence, and for causing the crawler to send the applet running in the browser, for the query to the web server for the next page referenced by the one web page, the selected parameters and a context arising from the particular sequence.

7. The computer program product of claim 6, the browser being configured to use a
   certain proxy, and refer to a resolver file for hostname-to-IP-address-resolution, wherein the web site server has an IP address and the proxy for the browser has a certain IP address, the certain IP address of the proxy being different than the IP address of the web site server, and wherein the resolver file indicates the certain IP address of the proxy as the IP address for the web site server.

8. The computer program product of claim 6, wherein the browser is configured to use a proxy gateway and the program code further comprises:
   fourth instructions for adding an onload attribute to one of the web pages by the proxy;
   fifth instructions for defining an event handler for the onload attribute by the proxy, wherein the event handler sets a certain variable; and
   sixth instructions for polling the certain variable by the applet to determine when the page is loaded.

9. The computer program product of claim 6, at least one of the web pages being dynamically generated by the server responsive to corresponding ones of the queries, the computer program product comprising:
   instructions for processing the server generated web pages to generate corresponding processed versions of the web pages, so that the processed versions can be served in response to future queries, reducing dynamic generation of web pages by the server.

10. The computer program product of claim 9, wherein at least a first such server generated web page has included in it an operation that would cause the server to dynamically generate a second web page if the first page were used to generate further requests to the server, and wherein the instructions for processing the server generated web pages to generate corresponding processed versions of the web pages comprise:

instructions for removing the operation from the first server generated web page and replacing the operation with a reference to a version of another of the server generated web pages.

11. An apparatus for crawling a web site, the apparatus comprising:

a processor connected a network, a storage device connected to the processor and the network, wherein the storage device is for storing a program for controlling the processor, and wherein the processor is operative with the program to execute a crawler program and a browser program for:

querying a web site server by the crawler, wherein at least one page of the web site has a reference, wherein the reference is specified by a script for producing an address for a next page;

parsing such a reference from one of the web pages and sending the reference to an applet running in a browser; and determining the address for the next page by the browser executing the reference and sending the address to the crawler, wherein the crawler automatically selects non-hypertext-link parameters from the one web page of the web site server by performing a programmed action sequence, including selecting items from lists of the one web page in a particular sequence, and the crawler sends the applet running in the browser, for the query to the web server for the next page referenced by the one web page, the selected parameters and a context arising from the particular sequence.

12. The apparatus of claim 11, the browser being configured to use a certain proxy and refer to a resolver file for hostname-to-IP-address-resolution, wherein the web site server has an IP address and the proxy for the browser has a certain IP address, the certain IP address of the proxy being different than the IP address of the web site server, and wherein the resolver file indicates the certain IP address of the proxy as the IP address for the web site server.

13. The apparatus of claim 11, wherein the browser is configured to use a proxy gateway and wherein an onload attribute is added to one of the web pages by the proxy, and an event handler is defined for the onload attribute to set a certain variable, and the processor is further operative with the program for:

polling the certain variable by the applet to determine when the page is loaded.

14. The apparatus of claim 11, at least one of the web pages being dynamically generated by the server responsive to corresponding ones of the queries, wherein the processor is operative with the program for:

processing the server generated web pages to generate corresponding processed versions of the web pages, so that the processed versions can be served in response to future queries, reducing dynamic generation of web pages by the server.

15. The apparatus of claim 14, wherein at least a first such server generated web page has included in it an operation that would cause the server to dynamically generate a second web page if the first page were used to generate further requests to the server, and wherein processing the server generated web pages comprises:

removing the operation from the first server generated web page and replacing the operation with a reference to a version of another of the server generated web pages.

\* \* \* \* \*